R. C. BRADLEY.
LIQUID DISPENSING APPARATUS.
APPLICATION FILED OCT. 20, 1915.

1,204,242.

Patented Nov. 7, 1916.
8 SHEETS—SHEET 1.

R. C. BRADLEY.
LIQUID DISPENSING APPARATUS.
APPLICATION FILED OCT. 20, 1915.

1,204,242.

Patented Nov. 7, 1916.
8 SHEETS—SHEET 2.

R. C. BRADLEY.
LIQUID DISPENSING APPARATUS.
APPLICATION FILED OCT. 20, 1915.

1,204,242.

Patented Nov. 7, 1916.
8 SHEETS—SHEET 5.

R. C. BRADLEY.
LIQUID DISPENSING APPARATUS.
APPLICATION FILED OCT. 20, 1915.

1,204,242.

Patented Nov. 7, 1916.
8 SHEETS—SHEET 7.

WITNESSES:
L. A. Stanley
N. E. Beck

INVENTOR
RICHARD C. BRADLEY,
BY Munn & Co.
ATTORNEYS

R. C. BRADLEY.
LIQUID DISPENSING APPARATUS.
APPLICATION FILED OCT. 20, 1915.

1,204,242.

Patented Nov. 7, 1916.
8 SHEETS—SHEET 8.

UNITED STATES PATENT OFFICE.

RICHARD C. BRADLEY, OF SHREVEPORT, LOUISIANA, ASSIGNOR OF ONE-FOURTH TO LEE KINNEBREW AND ONE-FOURTH TO J. MALEY EASTHAM, BOTH OF SHREVEPORT, LOUISIANA, AND ONE-FOURTH TO C. FRANK IRELAND, OF HOUSTON, TEXAS.

LIQUID-DISPENSING APPARATUS.

1,204,242.  Specification of Letters Patent.  Patented Nov. 7, 1916.

Application filed October 20, 1915. Serial No. 56,953.

*To all whom it may concern:*

Be it known that I, RICHARD C. BRADLEY, a citizen of the United States, and a resident of Shreveport, in the parish of Caddo and State of Louisiana, have invented a certain new and useful Improvement in Liquid-Dispensing Apparatus, of which the following is a specification.

My invention relates to improvements in dispensing apparatuses, and it consists in the combinations, constructions, and arrangements herein described and claimed.

A further object of my invention is to provide a liquid dispensing apparatus which may be used in connection with delivery wagons for dispensing oils or other liquids or at service stations, and in which a locking device is provided which must be manipulated with a key in order to obtain access to the liquids, means being provided for recording the number of the key, thereby indicating the person who has drawn off the liquid.

A further object of my invention is to provide a device of the type described which is provided with movable handles, these handles being normally locked but being freed by the turning of the key in the lock so that upon the manipulation of the handles the valves which control the liquid may be turned.

These and many other objects will appear in the following specification, and the novel features of the device will be particularly pointed out in the appended claims.

My invention is illustrated in the accompanying drawings forming part of this application, in which similar reference characters indicate like parts in the several views, and in which—

Figure 17:
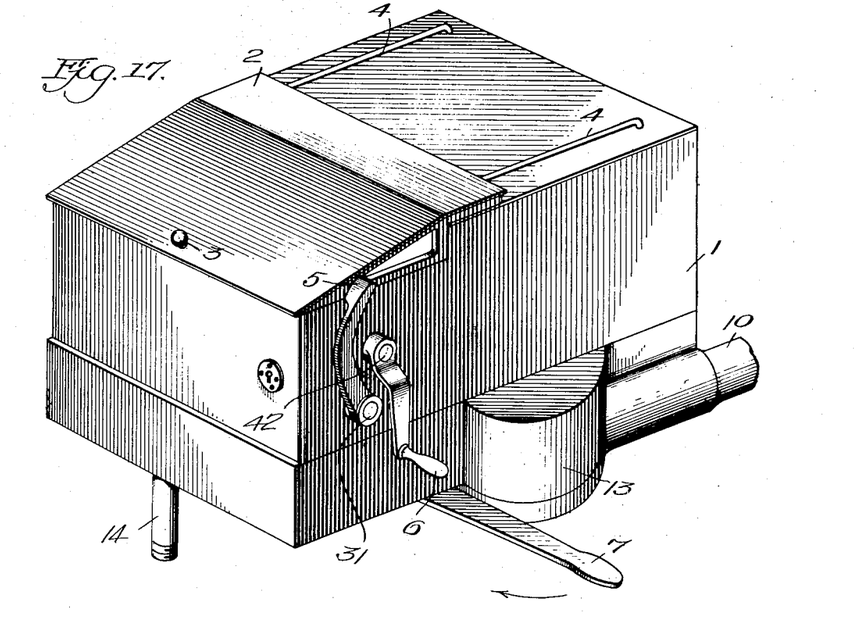
Fig. 17 is a perspective view of the apparatus as a whole.

Referring now particularly to Fig. 17, I have shown therein a casing 1, which is provided with a slidable top 2, this top having a knob 3 by means of which it can be moved rearwardly upon the guide members 4. At the side of the casing, it will be observed, is a lever 5, a crank handle 6, while at the bottom of the casing is a lever or handle 7.

Figure 1:
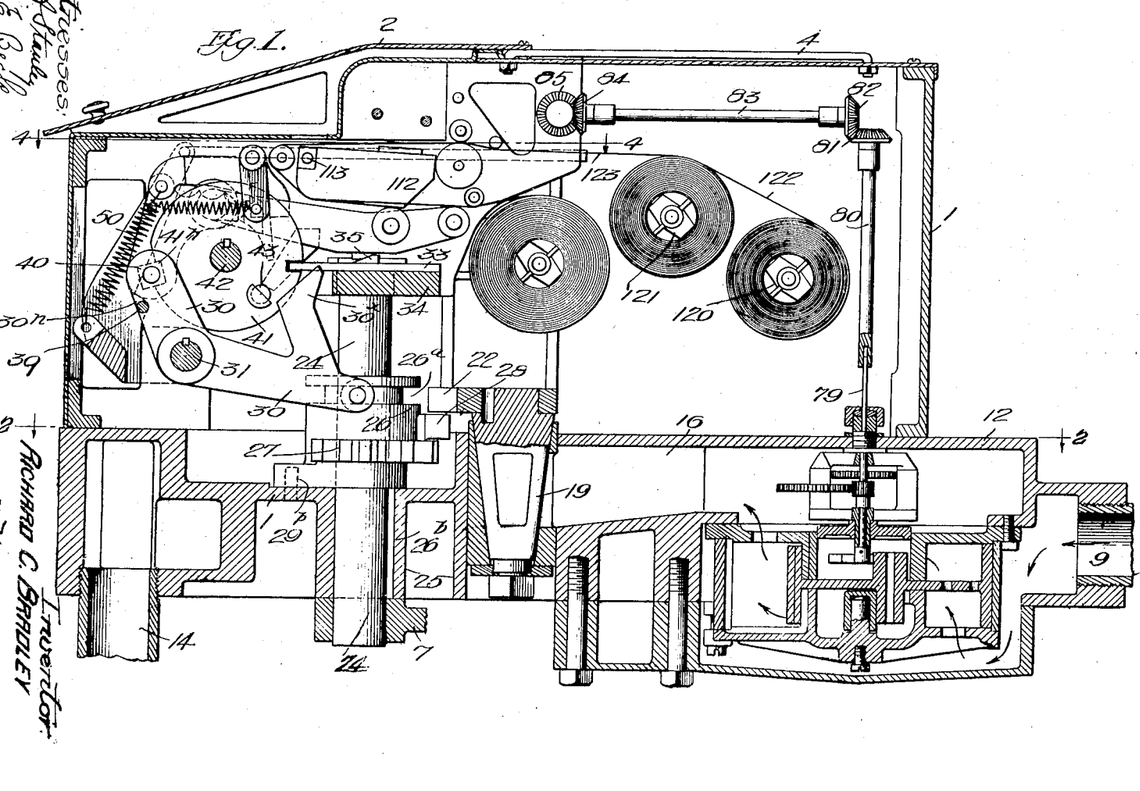
Figure 1 is a sectional view of the device along the line 1—1 of Fig. 2.
Figures 2, 3:
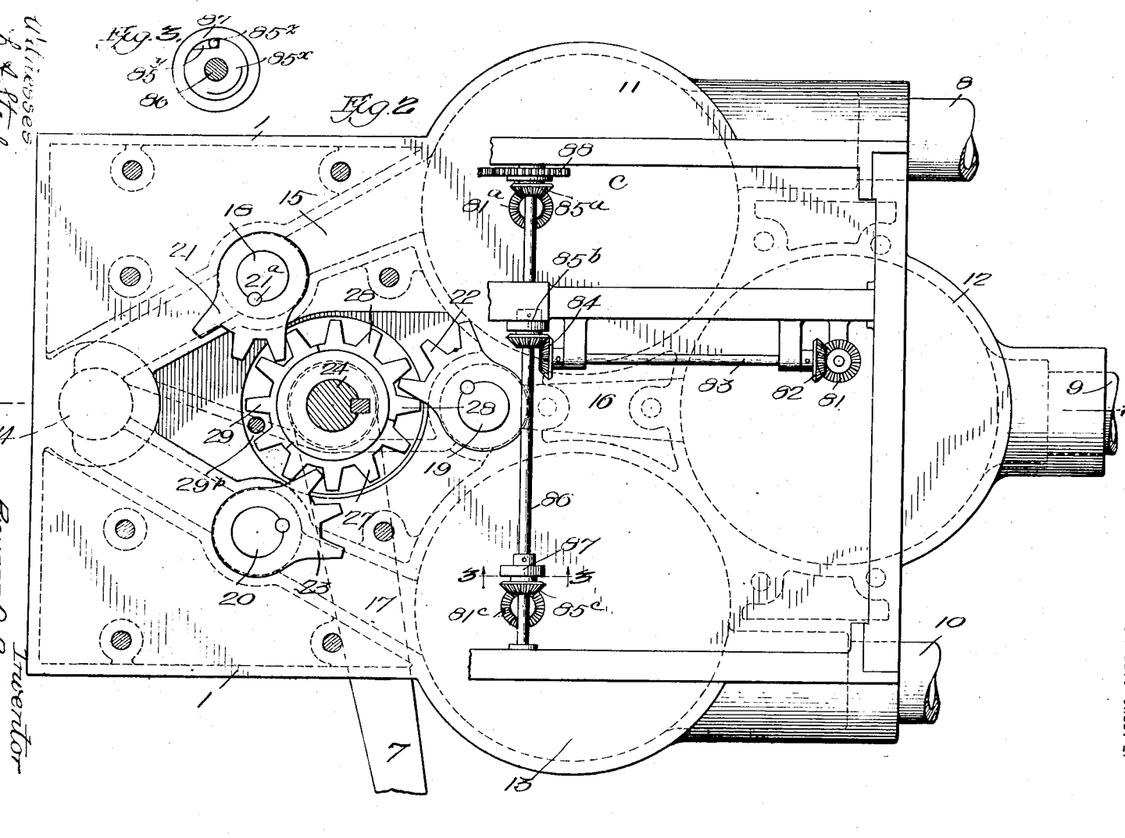
Fig. 2 is a sectional view along the line 2—2 of Fig. 1.
Fig. 3 is a section along the line 3—3 of Fig. 2.

Referring now to Fig. 2, it will be seen that there are three inlet tubes or pipes 8, 9, and 10 respectively, communicating with fluid meters 11, 12, and 13 respectively. These meters are of the standard type as shown in Fig. 1. The specific construction of the meters forms no part of my present invention. Each meter may be put into communication with a common discharge pipe. As will be seen from Fig. 2, the meter 11 has a pipe 15, shown in dotted lines, which communicates with the meter at one end and with the pipe 14 at the other. A conduit 16 establishes communication between the meter 12 and the pipe 14, while a conduit 17 connects the meter 13 with the pipe 14. Each of these conduits 15, 16, and 17 is provided with a valve like that shown at 19 in Fig. 1, these valves being shown at 18, 19, and 20 in Fig. 2.

Secured to the valve 18 by means of a pin or key 21ª, is a segmental gear 21 while the valves 19 and 20 are provided with similar gears 22 and 23 respectively. Referring now particularly to Fig. 1, it will be seen that I have provided a shaft 24 which is rotatably mounted in the casing, as shown at 25. The shaft is provided with a slidable sleeve 26, the lower portion of the sleeve having a segmental gear consisting of four teeth 27, an intermediate section 28 of four teeth, and an upper section 29. The sleeve 26 is turned by the shaft 24, owing to the feather $26^b$ but can slide longitudinally of the shaft. The teeth 29 mesh with the teeth 21, the teeth 28 with the teeth 22, and the teeth 27 with the teeth 23, according to the position of the sleeve 26 on the shaft 24. This is regulated by means of a yoke 30 which engages in a groove $26^a$ of the sleeve 26. The yoke 30 is keyed on a shaft 31, this being the shaft that projects through the side of the casing, as shown in Fig. 17, and which bears the lever 5.

Figure 5:
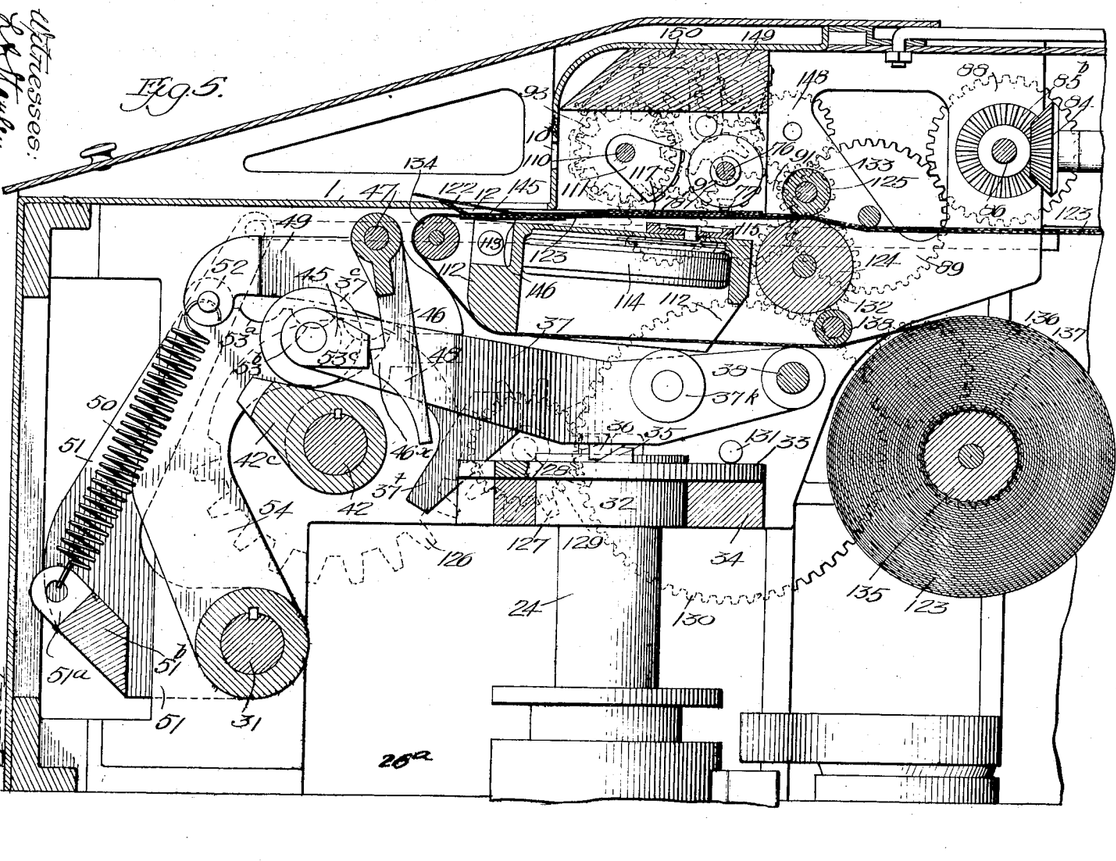
Fig. 5 is a sectional view along the line 5—5 of Fig. 4.

Referring now to Fig. 5, which is an enlarged sectional view, it will be seen that the upper end of the shaft 24 is secured to the hub 32 of a disk 33. This hub is journaled in a block 34 so that the upper end of the shaft is kept from lateral movement. The lower face of the disk 33 rests upon the block 34 as shown in Fig. 5. The disk 33 is provided with a series of cam wedges 35 which engage similar cam wedges 36 of the under side of a lever 37 which is pivotally mounted at 38. It will be obvious that when the disk 33 is turned, in one direction, the lever 37 will be caused to move upwardly. When the members 35 and 36 have cleared each other, the lever is permitted to descend.

Referring again to the member 30, I have stated that this is a yoke, but it will be observed from Fig. 1 that it is a bell crank lever. This lever has a notch $30^n$ into which a pin 39 is designed to extend, but which pin may be withdrawn in the manner hereinafter described. On one side of the portion bearing the notch $30^n$ is secured a square lug 40, see Figs. 1 and 4, this lug being arranged to enter a notch $41^n$ in a disk 41. The latter is mounted on a shaft 42 which projects through to the outside of the casing, and to which the crank handle 6 is fastened, see Fig. 17. The disk 41 bears on one side thereof a pin 43 of semi-cylindrical shape, as shown in Fig. 1. This pin coöperates with the portion $30^x$ of the yoke 30 in the manner hereinafter described.

Figure 4:
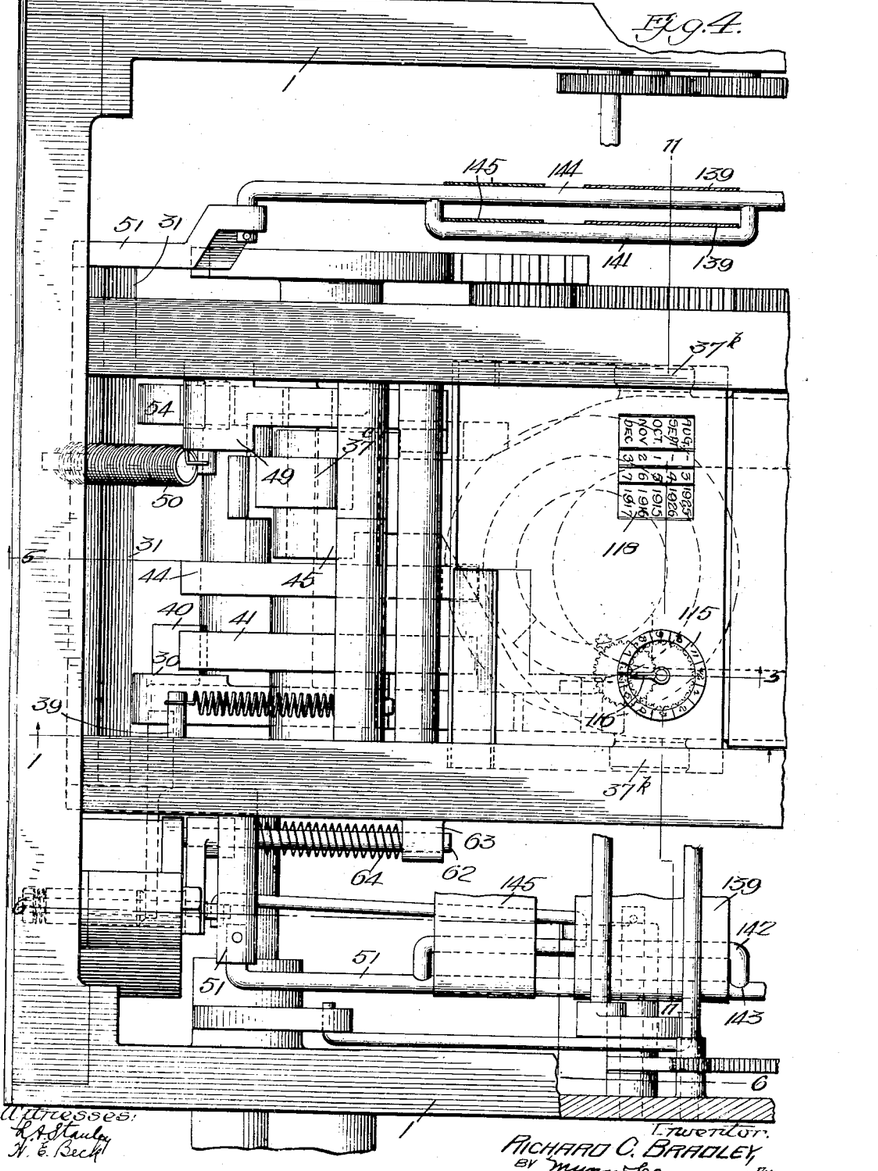
Fig. 4 is an enlarged sectional view along the line 4—4 of Fig. 1.
Figures 6, 7, 8, 9, 10, 19:
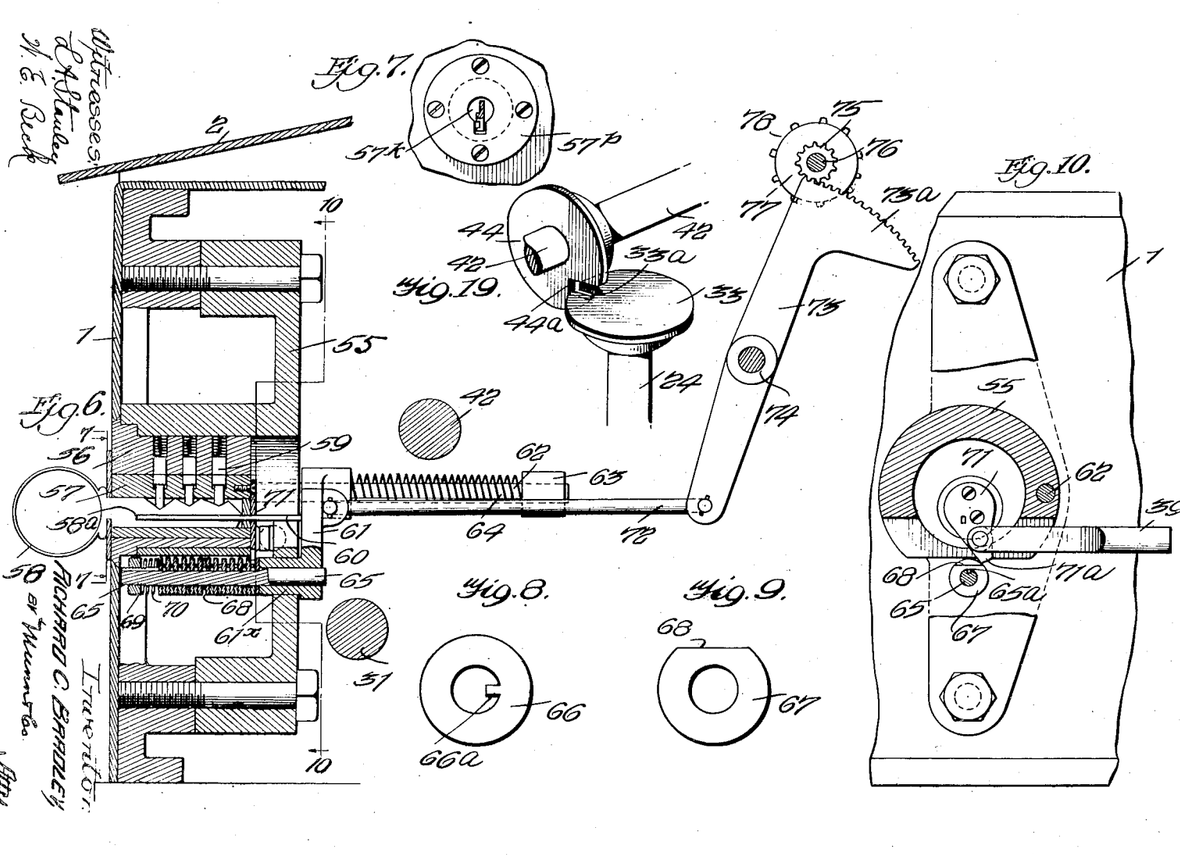
Fig. 6 is a sectional view along the line 6—6 of Fig. 4.
Fig. 7 is a sectional view along the line 7—7 of Fig. 6.
Fig. 8 is a detail face view of one of the "plug out" washers.
Fig. 9 is a face view of another of the "plug out" washers.
Fig. 10 is a section along the line 10—10 of Fig. 6.
Fig. 19 is a perspective view of a portion of two interlocking disks.

The shaft 42 also bears a disk 44, see Figs. 4 and 19, this disk having a slot $44^a$. The disk 44 is arranged to engage the disk 33 which is also provided with a notch or recess $33^a$ in its periphery. The mutual action of the disks 44 and 33 will be explained hereafter.

I have described enough of the mechanism thus far to enable one to understand the operation of turning the valves or cocks which permit the drawing off of the various liquids. As will be seen from Fig. 1, the pin 39 will prevent the movement of that portion of the yoke 30 which is in immediate contact with it. This pin 39 may be withdrawn out of the slot $30^n$ so as to permit the movement of the yoke 30. The means by which this is done will be explained later. Assuming that the pin is withdrawn and that the handle 5, see Fig. 17, is depressed the shaft 31 is rotated and the yoke 30 lifts the sleeve 26. The distance to which the sleeve is lifted is gaged by the distance through which the handle 5 is moved, and it will be explained hereinafter how it might be moved to a predetermined distance. Let us assume for the time being that the sleeve has been moved so as to bring the teeth 28 into engagement with the segmental gear 22. Now when the crank handle 7 is pulled in the direction shown by the curved arrow in Fig. 17, the valve or cock 19 is turned so as to permit a flow of the liquid. In Fig. 1 this flow would be from the pipe 9 through the meter in the direction shown by the arrows out through the conduits 16 and to the pipe 14.

At the first rotation of the shaft 24 the cam members 35 and 36 will cause a movement of the lever 37, see Fig. 5, upwardly. This lever 37 has a boss 45 which engages above a shoulder $46^x$, on a locking dog 46 which is pivoted at 47. On the opposite side of the lever 37 from the boss 45 is a lug 48 shown in dotted lines in Fig. 5, which engages behind a catch 49, which is pivotally mounted on the shaft 47, which shaft bears the pivoted locking dog 46. As will be seen from Fig. 5, a spring 50 is secured to an ear $51^a$ on the yoke 51.

One of the main functions of the lever 37 is to cause the device to print a receipt, and the purpose of locking this lever by the movement which has just been described, is to prevent the shifting of the lever 5, after the crank handle has been turned to draw off a high priced commodity like gasolene, to register and receipt for a lower priced commodity like kerosene. In other words, it prevents anyone from cheating the company or firm which is selling the oil by compelling the one who draws the commodity to go through to the end of the operation, whereupon the operation will be registered as it actually occurred.

The mechanism by means of which the lever 5 may be shifted to predetermined points which correspond to given commodities, such as kerosene number 1 grade, kerosene number 2 grade, and gasolene, as best shown in Fig. 5. In this figure it will be seen that the latch 49 is provided with a roller 52 at one end which is arranged to enter notches 53ª, 53ᵇ, and 53ᶜ in the arm 54 which is secured to the shaft 31. As the shaft 31 is turned by the handle 5, it is turned so that the end of the latch 49 will be raised, the roller dropping into the notches as the handle is moved. When, however, the lug 48 is brought in front of the opposite end of the latch 49 by a slight upward movement of the lever 37 out of the engagement of the cam members 35 and 36, then the latch 49 cannot be moved and the roller 52 which is now in one of the notches 53ª, 53ᵇ, or 53ᶜ will prevent further movement of the arm 54 and hence of the handle 5.

Before proceeding further with the explanation of the operation of the printing device, I will at this point explain the means by which the pin 39 is withdrawn so as to permit the operation of the yoke 30.

Figures 11, 20, 21:
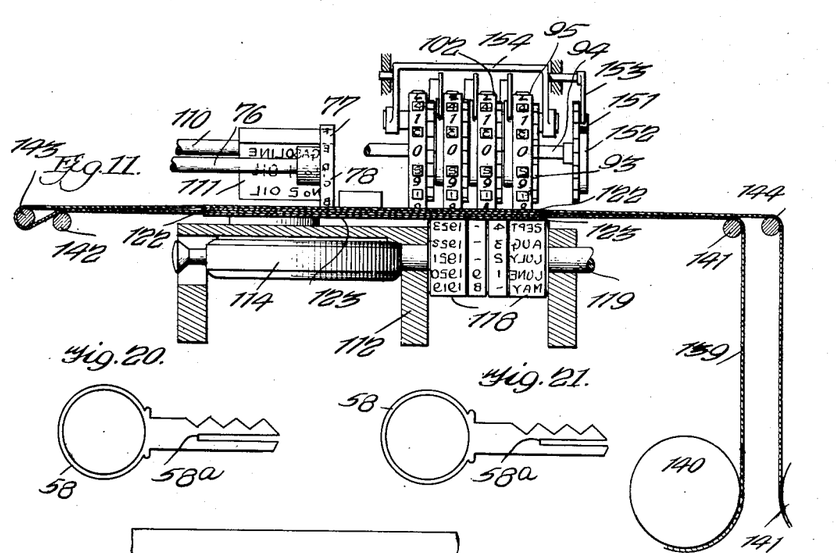
Fig. 11 is a section along the line 11—11 of Fig. 4.
Figs. 20 and 21 are face views of keys used with the dispensing device.

Referring now particularly to Fig. 6, I have shown therein a locking mechanism of the so-called pin-tumbler type. Disposed on the inside of the casing 1 is a lock casing 55. This casing 55 contains an outer barrel 56, an inner cylinder 57 being provided and being slotted to receive any one of a plurality of keys, such as those shown in Figs. 20 and 21. The key is provided with a slot 58ª in one side thereof, these slots being of different lengths as shown in Figs. 20 and 21. The keys are shaped so as to operate the pins 59 in the usual manner. It will be observed however that the end of the slidable bar 60 is arranged to enter the slot 58ª and to engage the shoulder 58ᵇ. This bar 60 is pivotally connected with a yoke 61 which bears a rod 62 slidable into and out of the casing 55, see Figs. 6 and 10. The rod also slides through a lug 63 secured to the frame of the device and which acts as a guide. Disposed between the lug 63 and a portion of the yoke, is a spring 64 which normally tends to push the rod 60 forwardly.

The yoke 61 has a cylindrical portion 61ˣ which is cored to receive a rod 65, the lug being driven into the bore so as to be held securely. The rod 65 has a slot 65ª into which the lug 66ª of washers 66 may be projected, these washers being slipped over the rod 65 and being spaced apart by washers 67 of the shape shown in Fig. 9, which have a cut-away portion with a flat surface 68. The end of the rod 65 is threaded as shown at 65ˣ to receive a nut 69, a spring 70 being interposed between the nut and the washers. Secured to the cylinder 57 at the end is an arm 71 whose end 71ª, see Fig. 10, is arranged to swing into the spaces just above the flat portion 68 of one of the washers 67 when the key is turned. In Fig. 6 I have shown the key 58 as being pushed in so as to move the yoke 61 and the washers, and thereby bring the first washer into registration with the arm 71. Now, when the key is turned, the arm 71 will enter the spaces between the flat portion 68 of the washer. A key having a shorter slot would push the rod 60 of the yoke 61 a farther distance and hence bring the arm 71 into registration with some other of the washers 67. The purpose of the washers 66 is two-fold. In the first place, it permits frictional engagement of the washers so as to hold them normally in the position shown in Fig. 6 for the majority of washers, and it also prevents a mis-fit key from operating the lock, as for instance, where one should attempt to alter the length of the slot in the key, because such attempt would only result in the arm 71 coming in contact with the periphery of a washer 66, unless such alteration should result in duplicating one of the original accurately cut keys, which is not likely to happen. If now it should be desired to exclude the holder of any key from operating the lock, all that is necessary is to turn one of the washers 67 thirty degrees or more. Now, when the arm 71 is turned it will strike the washer 67 which prevents further turning of the barrel and hence prevents unlocking of the device. In Fig. 6 I have shown one of these washers 67 as turned to bring the flat portion 68 on the under side and the rounded portion on top.

Secured to the yoke 61 and movable therewith, is a link 72 which is attached to a lever 73 pivoted at 74. The lever is provided on one end with a segmental gear portion 73ª arranged to engage a gear or pinion 75 on a shaft 76. This shaft 76 has at one end thereof a wheel 77 having type 78 arranged to print a character or letter which identifies the particular key used in the lock, see Figs. 5, 6, 11 and 12.

Referring particularly to Fig. 10, it will be seen that the arm 71 is pivotally connected with a bolt or pin 39 which as stated before is the locking member, see Fig. 1, that normally keeps the yoke 30 from being operated.

I have up to this point shown how the insertion of the key will bring into operation the printing wheel for identifying the particular key, how the turning of the lock will withdraw the locking pin 39, how the lever 5 selects the commodity to be dispensed or withdrawn, and how the operation of the valve handle 7 turns on the fluid.

Referring now again to Fig. 1 I have shown a shaft 79 which is the shaft that normally bears an indicating hand with a meter. This hand is removed and in its place is disposed a shaft 80 bearing a gear 81, which meshes with a gear 82 on a shaft 83 having a gear 84 which meshes with a gear 85$^b$ on a shaft 86. The latter bears gears 85$^a$ and 85$^c$ which are similar to the gear 85$^b$ and which connect with gears 81$^a$ and 81$^c$ respectively secured to shafts like that shown at 80 in connection with the meter 12 but which shafts are turned by the meters 11 and 13 respectively. The shaft 86 is designed to be driven by any one of the gears 85$^a$, 85$^b$, or 85$^c$, but two of these driving gears are designed to remain stationary while the other driving gear is turning the shaft. To this end I have arranged these gears in accordance with the construction shown in Fig. 3. In this instance, the gear 85$^c$ has its hub portion 85$^x$ provided with a slot 85$^y$ arranged to receive a ball 85$^z$. The hub portion 85$^x$ revolves in the clutch member 87. It will be apparent that if the hub portion 85$^x$ of the gear 85$^c$ should revolve in the direction shown by the arrow in Fig. 3, it will cause the ball 85$^z$ to run to the narrow end of the slot 85$^y$, thereby clutching the member 87 which is fixed to the shaft and will thus turn the shaft 86. If the shaft should be turned in the same direction by one of the other driving gears, the clutch member 87 would roll the ball 85$^z$ to the end of the slot 85$^y$, as shown in Fig. 3, thereby freeing the gear from the shaft.

Figure 14:
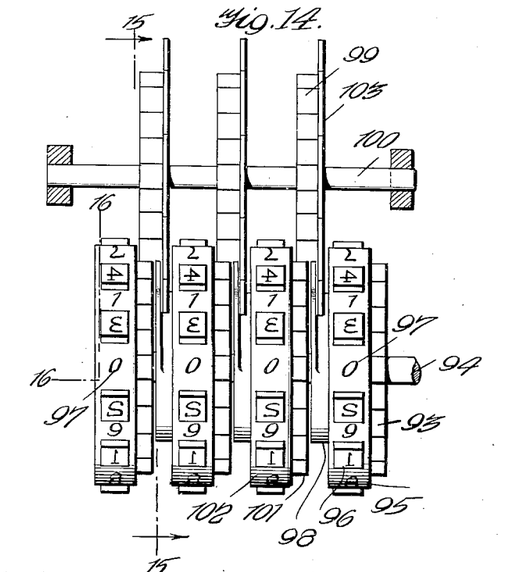
Fig. 14 is an enlarged detail view of the number wheel shown in Fig. 11.
Figure 15:
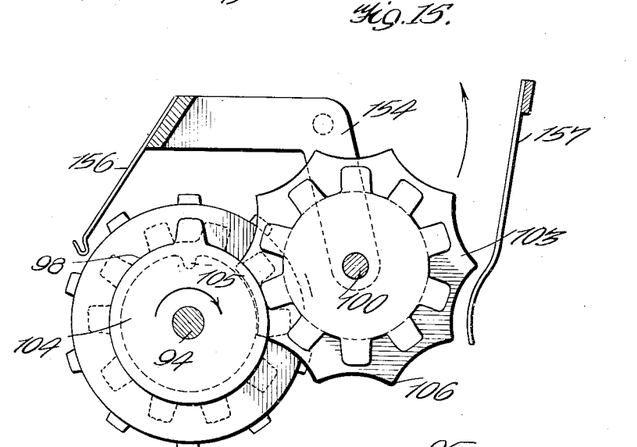
Fig. 15 is a sectional view along the line 15—15 of Fig. 14.

The shaft 86 has a gear 88 and connected with the gear 88 is a gear train, see Fig. 5, consisting of the gears 89, 91, 92, and 93. The gear 93 is on the shaft 94 which bears a series of gears and associated number wheels as shown in Figs. 11 and 14. These number wheels are of the ordinary construction, and form no part of my invention, except in so far as they coöperate with the remaining parts of the apparatus for registering and recording the amount of liquid dispensed. The first number wheel 95 is provided with type 96 and between the adjacent types are numerals 97. The types 96 are designed to print the numerals while the numerals 97 are designed to furnish a visible disclosure of the amount. Secured to the wheel 95 is a mutilated gear 98 having one tooth arranged to mesh with a gear 99 on a shaft 100. This gear 99 also meshes with a gear 101 on a number wheel 102. It will be observed from Fig. 15 that there is a Geneva movement consisting of a star wheel 103 associated with the gear 99 which engages a disk 104 having a recess 105 arranged to receive the teeth 106 of the star wheel so that when a tooth of the mutilated gear 98 engages the teeth 99, the wheel 103 will be revolved one tooth and after a revolution will be locked, thereby locking the remaining gears and number wheels and preventing any movement during the subsequent printing operation. The other two number wheels, shown in Fig. 14, are merely wheels of a higher order and it is obvious that as many as necessary might be employed.

Figures 12, 13:
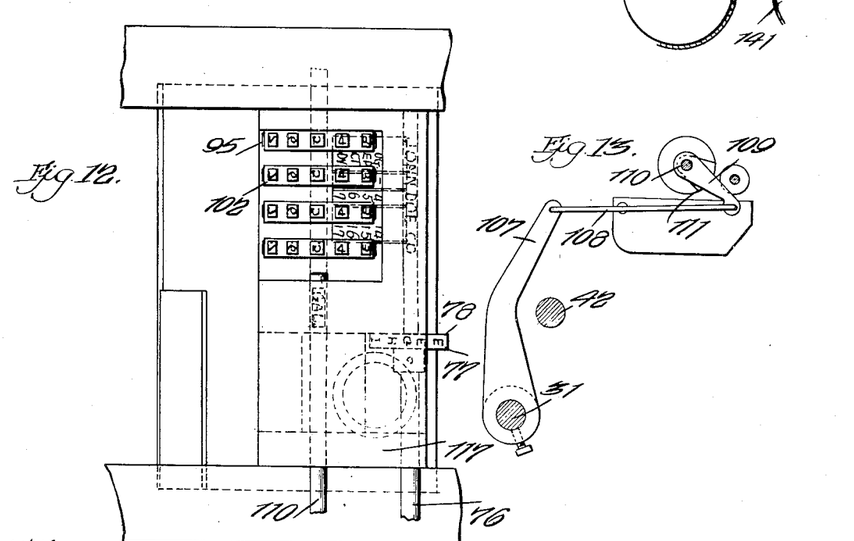
Fig. 12 is a plan view of the mechanism shown in Fig. 11.
Fig. 13 is a detail view of a portion of the recording device.

Referring now to Fig. 13, it will be seen that the shaft 31 bears an arm 107 which is connected by means of a link 108 with an arm 109 on a shaft 110 which bears a type segment 111, see Figs. 5 and 11. This type segment bears three legends or names, see Fig. 11, which are preferably "Gasolene," "Oil #1," and "Oil #2," and these correspond with the notches 53$^c$, 53$^b$ and 53$^a$ respectively, see Fig. 5; that is to say, when the lever 5 is pulled so as to bring the roller 52, see Fig. 5, in the notch 53$^c$, the shaft 31 will be moved, so that the arm 107 will turn the type segment 111 into a position to print the word "Gasolene."

Referring now particularly to Figs. 1 and 5, it will be seen that I have provided a platen 112 which is pivoted at 113. This platen consists of a block having recesses on its under side in which is mounted a time piece 114, this time piece being preferably a watch of a well known make. The hour spindle of the time piece 114 is connected by gearing 115 see Fig. 5, with a printing hand 116 which moves over the inner circumference of the circle of figures representing the hours of the day. This construction is ordinary. It will be observed that there is plate 117, see Figs. 5 and 12, on the opposite side of the printing ribbons from the hour dial, so as to form a platen. On the under side of the ribbons are the date wheels, see Fig. 11, these wheels being shown at 118 and being on a shaft 119. These wheels may be turned at will to set up the correct date and are designed to be frictionally held in position for printing. The figures which indicate the time and those which indicate the date are on the under side of the ribbon, while the remaining figures or type with the other data are on the upper side of the ribbon.

The reels for holding the printing strips are best shown in Fig. 1. The reel 120 holds a flexible strip which serves for the purpose of a receipt or ticket. The reel 121 holds the paper which forms the record. The strip 122 on the reel 120 passes above a strip 23 on the reel 121. As will be seen from Fig. 5, the record strip 123 passes forwardly between the feed rollers 124 and 125. These rollers are driven by a chain of gears which consist of the gear 126 on the shaft 42, see Fig. 5, the gear 127 on the shaft 128, the gear 129 on the same shaft, the gear 130 on the shaft 131, gear 132 which is connected with the feed roller 124, and gear 133 which is connected with the feed roller 125. The record strip 123 passes forwardly over a roller 134 and down underneath a corner of the platen 112, upwardly, and thence around the reel 135. This reel is driven by a gear 130 through the medium of an idler 136 and a gear 137 which is connected with the reel 135. The reel 138 is a pressure roller for keeping the feed rollers together.

In Fig. 11 I have shown a ribbon 139 which is designed to be wound on the reel 140 at one end and which passes over the guides 141 and 142, around a guide roller 143 and back over a guide roller 144 to the reel 141. The ticket strip 122 passes between the upper and lower portions of the loop formed by the ribbon while the record strip 123 passes underneath the lower portion of the ribbon. Farther on, as will be seen in Fig. 5, the receipt or ticket strip passes above another ribbon 145 while the record strip 123 passes below the ribbon. A stationary platen 146 is disposed below the last named ribbon.

The printing mechanism *per se* forms no part of the present invention.

Referring to Fig. 4, it will be seen that the ribbons 139 and 145 are carried on guides carried by the yoke 51 which extends from one side of the machine to the other and which is hinged to the shaft 31, see Fig. 5. The object of having this yoke movable is so that when the gasolene is drawn the receipt may be printed in red. To this end, a bicolor ribbon 139 is used, that is to say, one having a blue or black color and a red. This ribbon is made up of six different stripes, there being three black or blue stripes alternating with three red stripes, the idea being that when the ribbon is shifted the space of one stripe, a red portion of the ribbon will be brought under each line of type. Where the type are arranged on lines half an inch apart and the stripes on the ribbon are a quarter of an inch wide, the shifting of the ribbon a quarter of an inch will change from black or blue to red. The means by which this change is effected is shown best in Fig. 5. As long as the arm 54 which is attached to the shaft 31 bearing the handle 5 is shifted to bring the notches 53$^a$ and 53$^b$ in registration with the roller 52, the yoke is not moved but when the arm 54 is shifted so as to bring the roller 52 in registration with the notch 53$^c$, then the arm 54 will come into engagement with the box 51$^b$ and will move the yoke on the shaft 31 as a pivot, thus shifting the ribbon so as to print red. When the handle 5 is turned to its neutral position, it will move the yoke back to its normal position by means of the spring 50.

From the foregoing description of the various parts of the device, the operation thereof will be readily understood. In describing the operation I will recapitulate in part. The device, as stated, is primarily designed to be attached to a tank wagon to check up the sales of gasolene and oil. Let us assume that the customer wishes to buy fifty gallons of oil number 2. The driver of the tank wagon first slides back the cover 2 and then inserting his key in the key hole 57$^k$ in the plate 57$^p$, he pushes back the rod 60 as stated, and by means of the lever 73, gears 73$^a$ and 76, he sets the type 78 on the wheel 77 so as to bring the type into printing position to indicate the number or character which will identify the key. He now turns the key which causes the retraction of the bolt 39 through the movement of the arm 71 in the manner already described. If any one of the washers 67 should be turned to prevent the movement of the arm 71, then the user of the key could not obtain the commodity nor could he operate the various levers for registration, etc. The retraction of the bolt 39 permits the lever 5 to be operated, this lever being on the shaft 31 which now swings the lever 5 until the arm 54, see Fig. 5, is brought to the notch 53$^a$ in registration with the roller 52, thus setting the device for oil number 2. This movement in turn lifts the sleeve 26 through the movement of the yoke 30 which is on the shaft 31 and brings the gears 28 in mesh with the segmental gear 22. The latter is on the cock 19 which is disposed in the conduit 16 leading to the meter 12. It will be observed that secured to the frame 1 is a pin 29$^p$ which normally extends between the teeth of the gear 29, see Fig. 2, so that the sleeve upon which this gear is carried is locked against rotation thereby locking the handle 7 in position. Now, when the sleeve is moved upwardly by the yoke 30, as described, the teeth 29 clear the pin 29$^p$, thus unlocking the handle 7 and permitting movement so as to rotate the gear 28 and turn the cock 19 so as to permit a flow of the fluid. The fluid now passes through the meter and conduit 16 to cock 19, and to the pipe 14, and as the fluid passes the meter registers the amount through the medium of the mechanism already described. Right here I would state that after the lever 7 is moved in the slightest degree, it is necessary for the one who is dispensing the liquid to go through a complete operation, that is to say, he must operate the mechanism so that the machine will record what has actually been done before he can do anything else, such as change to another commodity. When the desired amount has been drawn, which amount will appear in the opening 1$^c$ as shown in Fig. 5, he shuts off the lever 7 and the device is now in condition to print the record. The record cannot be printed until the handle or lever which turns on the cock 19 is back in its normal position. This is because of the fact that the slot 33$^a$ on the disk 33 and the slot 44$^a$ on the disk 44 see Fig. 19, must be normally in registration, and this only occurs when the handle 7 is in normal position and the crank handle 6 is in its normal position.

Having shut off the flow of fluid, the crank handle 6 is now turned. The crank handle 6 is on the shaft 42 which as seen from Fig. 5, bears a cam 42$^c$ which engages a cam roller 37$^c$ on the arm 37, thus receiving the arm 37 and bringing the rollers 37$^k$ into engagement with the bottom of the platen 112, thus forcing the latter upwardly. Further motion of the cam 42$^c$ engages the latch member 46 which as stated before, is held by the lug 45 and thereafter the arm 37 in an upper position, and this permits the arm 37 to drop downwardly and the platen 112 to return. As will be seen from Fig. 1, the rotation of the shaft 42 will cause rotation of the disk 41 which bears a pin 43. This pin will engage the extension 30$^x$ of the yoke 30 and force it downwardly, thereby bringing the teeth 28 and 22 out of mesh. The cam 42$^c$, see Fig. 5, also hits a portion 37$^t$ on the arm 37, tending to restore the arm 37 to its normal position.

Figure 18:
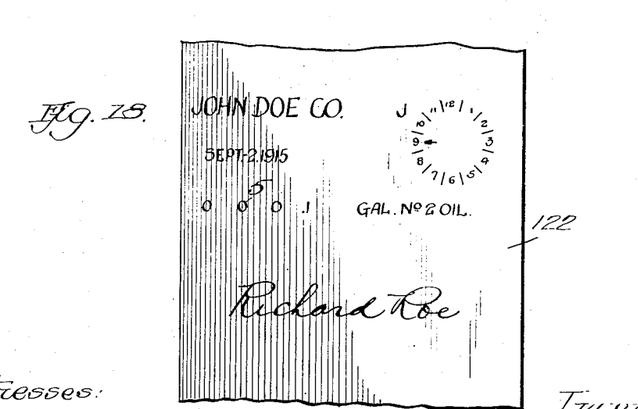
Fig. 18 is a face view of the printed receipt delivered by the apparatus.

It will be observed that the gear 126 which is on the shaft 42, see Fig. 5, is a segmental gear, that is to say, it has teeth only on one half so that during the initial movement of the shaft 42 the gear 126 is ineffective. As soon, however, as the teeth on the gear come into mesh with the teeth 127, see Fig. 5, movement is transmitted to the feed rollers 124 and 125 as already described and also to the record roller 135, so as to cause the roller to move thereby winding on the record strip 123. The movement of the feed rollers 124 and 125 moves the ticket strip out through the opening 1$^r$ in the casing 1. It will be understood that prior to the cranking of the device the printing of the ticket and name of the customer should be written on the receipt in the opening 1$^r$, this being transferred to the record strip through the medium of the ribbon 145. The receipt or ticket is torn off with the edge of the opening as a straight edge, and given to the customer. This receipt or ticket is of the form shown in Fig. 18.

Figure 16:
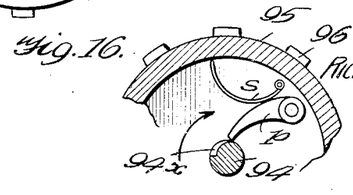
Fig. 16 is a fragmentary detail view of a portion of the re-setting device.

The movement of the gear 133, see Fig. 5, causes a movement of the gear 148, and this movement is transmitted by gears 149 and 150 to a gear 151, see Fig. 11, on shaft 94. The rotation of the gear 151 causes a cam 152 to move until a pawl 153 on a yoke 154 leaves a lug or tooth 155 on the cam 152, thereby permitting the swinging of the yoke 154, so as to bring the set of gears on the shaft 100 out of mesh with the gears on the shaft 94. The friction spring 156 is provided for engaging the gears on the shaft 94 to hold them frictionally and to keep them from spinning while the spring 157 engages the star wheel 103 so as to prevent them from getting out of alinement and enabling them to again go back into mesh. The shaft 94, as will be seen from Fig. 16, is provided with a groove 94$^x$ which is arranged to engage a pawl $p$ on each of the number wheels 95 and 102, etc., this pawl being pressed upon by a spring $s$ so as to turn the number wheel with the shaft. The movement of the shaft 94 is limited by the fact that as soon as the drive shaft 42 turns the disk 41 see Fig. 1, far enough the block 40 on the yoke 30 drops into the slot 41$^n$. By this time the number wheels will all have been reset to zero and the pawl 153 is now resting on the cam lug 155 which throws the yoke 154 into its normal position thereby bringing the wheels on the shaft 100 in mesh with those on the shaft 94.

Having dispensed the desired quantity of liquid the operator now withdraws the key from the lock and closes the cover 2. The withdrawal of the key from the lock restores the wheel 77 and returns the identification characters 78 to zero on the action of the spring 64.

I claim:—

1. In a liquid dispensing device, a casing, a plurality of liquid meters carried thereby, a supply pipe for each meter, a common discharge pipe, a conduit connecting each of said meters with said common discharge pipe, a valve or cock for controlling each of said conduits, an individual gear connected with each of said valves, and means for selectively engaging any one of said gears and for rotating the gear thereby operating the valve associated with the gear.

2. In a liquid dispensing device, a casing, a plurality of meters carried by the casing, a supply pipe for each meter, a common discharge pipe, an individual conduit connecting each of said meters with said common discharge pipe, an individual valve in each of said conduits, a segmental gear associated with each valve, a rotatable sleeve provided with a plurality of sets of teeth, each set being arranged to engage one of the gears associated with said valves for operating the latter, and means for shifting the said sleeve to effect a selective operation of said gears.

3. In a liquid dispensing device, a casing, a plurality of meters carried thereby, a supply pipe for each meter, a common discharge pipe, an individual conduit for connecting each meter with said common discharge pipe, a rotary valve disposed in each of said conduits, a segmental gear associated with each of said rotary valves, a slidable sleeve, a plurality of sets of segmental gears carried by said sleeve, said segmental gears being disposed in parallel planes, and one set of said segmental gears being arranged to engage with a set of gears connected with said valves.

4. In a liquid dispensing device, a casing, a plurality of meters carried by said casing, a supply pipe for each meter, a common discharge pipe, an individual conduit connecting each meter with said common discharge pipe, a rotary valve disposed in each conduit, a segmental gear connected with each of said rotary valves, each of said segmental gears being in the same common plane, a slidable sleeve, a plurality of segmental gears carried by said slidable sleeve, said sleeve gears being in different parallel planes, and means for moving said sleeve to bring one of said sleeve gears into mesh with one of said valve gears.

5. In a liquid dispensing device, a casing, a plurality of meters carried by said casing, a supply pipe for each meter, a common discharge pipe, an individual conduit for connecting each meter with said common discharge pipe, a rotary valve in each of said conduits, an individual gear for operating each of said valves, said gears being in a common plane, a sleeve having a movement at right angles to said common plane and being provided with a circumferential groove, said sleeve having a plurality of gears, each of said gears being arranged to mesh with one of said individual valve gears, and means for moving said sleeve to selectively operate any of said valve gears.

6. In a liquid dispensing device, a casing, a plurality of meters carried by said casing, a supply pipe for each meter, a common discharge pipe, an individual conduit for connecting each meter with said common discharge pipe, a rotary valve in each of said conduits, an individual gear for operating each of said valves, said gears being in a common plane, a sleeve having a movement at right angles to said common plane and being provided with a circumferential groove, said sleeve having a plurality of gears, each of said gears being arranged to mesh with one of said individual valve gears, and means for moving said sleeve to selectively operate any of said valve gears, said last-named means comprising a pivoted yoke having a portion arranged to enter the circumferential groove in the said sleeve.

7. In a liquid dispensing device, a casing, a plurality of meters carried by said casing, a supply pipe for each meter, a common discharge pipe, an individual conduit for connecting each meter with said common discharge pipe, a rotary valve in each of said conduits, an individual gear for operating each of said valves, said gears being in a common plane, a sleeve having a movement at right angles to said common plane and being provided with a circumferential groove, said sleeve having a plurality of gears, each of said gears being arranged to mesh with one of said individual valve gears, means for moving said sleeve to selectively operate any of said valve gears, said last-named means comprising a pivotal yoke having a portion arranged to enter the circumferential groove in the said sleeve, and means for locking the yoke against movement.

8. In a liquid dispensing device, a casing, a plurality of meters carried by said casing, a supply pipe for each meter, a common discharge pipe, an individual conduit for connecting each meter with said common discharge pipe, a rotary valve in each of said conduits, a segmental gear connected with each valve, said segmental gears being in a common plane, a shaft having an axis at right angles to the common plane, a sleeve slidably disposed on said shaft, said sleeve being provided with a circumferential groove, a plurality of segmental gears on said sleeve, said gears being disposed in different planes parallel to said common plane, and means for shifting said sleeve longitudinally of said shaft to bring a gear on said sleeve in mesh with one of the gears associated with the valves.

9. In a liquid dispensing device, a casing, a plurality of meters carried by said casing, a supply pipe for each meter, a common discharge pipe, an individual conduit for connecting each meter with said common discharge pipe, a rotary valve in each of said conduits, a segmental gear connected with each valve, said segmental gears being in a common plane, a shaft having the axis at right angles to the common plane, a sleeve slidably disposed on said shaft, said sleeve being provided with a circumferential groove, a plurality of segmental gears on said sleeve, said gears being disposed in different planes parallel to said common plane, and means for shifting said sleeve longitudinally of said shaft to bring a gear on said sleeve in mesh with one of the gears associated with the valves, said sleeve being feathered to said shaft, whereby when the shaft is revolved the sleeve is revolved with it.

10. In a liquid dispensing device, a casing, a plurality of liquid meters carried by said casing, a supply pipe for each meter, a common discharge pipe, an individual conduit connecting each meter with said supply pipe, a valve disposed at each conduit, means including a rock shaft for operating said valves, and means including a second rock shaft for selectively bringing any of said valves into operative position with respect to said first-named rock shaft.

11. In a liquid dispensing device, a plurality of conduits, a valve for each conduit, a rock shaft adapted to operate any of said valves, means including a second rock shaft for selectively bringing said first-named rock shaft into operative relation with the predetermined valve, and means for preventing the movement of one rock shaft while the other is moving.

12. In a liquid dispensing device, a plurality of conduits, a valve for each conduit, a rock shaft adapted to operate any of said valves but being normally out of operative relation, means including a second rock shaft for selectively bringing said first-named rock shaft into operative relation with any predetermined valve when said second-named rock shaft is turned out of its normal position, and means for preventing the movement of either of said rock shafts when the other rock shaft is out of its normal position.

13. In a liquid dispensing device, a plurality of conduits, a valve for each conduit, a rock shaft adapted to operate any of said valves but being normally out of operative relation, means including a second rock shaft for selectively bringing said first-named rock shaft into operative relation with any predetermined valve when said second-named rock shaft is turned out of its normal position, and means for preventing the movement of either of said rock shafts when the other rock shaft is out of its normal position, said last-named means comprising a plate on each rock shaft, each of said plates having a slot arranged to receive a portion of the companion plate, the initial movement of one plate serving to lock the companion plate.

14. In a liquid dispensing device, a plurality of conduits, a valve for each conduit, a rock shaft adapted to operate any of said valves but being normally out of operative relation, means including a second rock shaft for selectively bringing said crank shaft into operative relation with any predetermined valve when said second-named rock shaft is turned out of its normal position, and means for preventing the movement of either of said shafts when the other shaft is out of its normal position, a circular plate or disk secured to each rock shaft, said disks being at right angles to one another and the peripheries of each of the disks being provided with a slot arranged to receive a portion of the other disk, said slots normally registering, the movement of one disk serving to cause the locking of the other disk.

15. In a liquid dispensing device, a pair of rock shafts disposed at right angles to each other, an arm carried by one of the rock shafts and being provided with a series of notches, a pivoted latch member having a roller designed to enter any of said notches, a pivoted arm having a stop member arranged to engage said latch member, and means carried by the other rock shaft for moving said pivoted arm when the second-named rock shaft is rotated.

16. In a liquid dispensing device, a pair of rock shafts disposed at right angles to each other, an arm carried by one of the rock shafts and being provided with a series of notches, a pivoted latch member having a roller designed to enter any of said notches, a pivoted arm having a stop member arranged to engage said latch member, and means carried by the other rock shaft for moving said pivoted arm when the second-named rock shaft is rotated, said last-named means comprising cam wedges carried by said rock shaft at the end thereof and by said arm.

17. In a liquid dispensing device, a rock shaft, an arm carried thereby, said arm having a plurality of notches, a pivoted latch having a roller arranged to enter any of said notches, a spring for normally holding the roller within the notch, a second rock shaft and means actuated by said second rock shaft for engaging the end of the latch on the opposite side of its pivot from the roller, thereby locking said notched arm in position.

18. In a liquid dispensing device, a rock shaft, cam members carried by the rock shaft at one end thereof, a pivoted arm, cam members carried by said pivoted arms and adapted to be engaged by the first-named cam members for raising the arm, a stop member carried by one end of said pivoted arms, and a pivoted latch member arranged to engage said stop member for holding said arm in a raised position.

19. In a liquid dispensing device, a rock shaft, cam members carried by the rock shaft at one end thereof, a pivoted arm, cam members carried by said pivoted arms and adapted to be engaged by the first-named cam members for raising the arm, a stop member carried by one end of said pivoted arms and a pivoted latch member arranged to engage said stop member for holding said arm in a raised position, a crank shaft and a cam carried by said crank shaft and arranged to engage said pivoted latch member for releasing said pivoted arm.

20. In a liquid dispensing device, a rock shaft, a sleeve slidably disposed on said rock shaft, a yoke for moving said sleeve, a rock shaft for carrying the yoke, a crank shaft, a disk carried thereby, and means carried by the yoke and arranged to engage the disk for locking the disk in position.

21. In a liquid dispensing device, a rock shaft, a sleeve slidably disposed on said rock shaft, a yoke for moving said sleeve, a rock shaft for carrying the yoke, a crank shaft, a disk carried thereby, and means carried by the yoke and arranged to engage the disk for locking the disk in position, said last-named means comprising a lug carried by a portion of the yoke and arranged to enter a notch in the disk.

22. In a liquid dispensing device, a rock shaft, a sleeve slidably disposed on said rock shaft, a yoke for moving said sleeve, a rock shaft for carrying the yoke, a crank shaft, a disk carried thereby, and means carried by the yoke and arranged to engage the disk for locking the disk in position, said last-named means comprising a lug carried by a portion of the yoke and arranged to enter a notch in the disk, the movement of the yoke serving to free the disk and to permit rotation thereof, and a pin carried by the disk and arranged to engage a portion of the yoke thereby forcing the latter into its original position.

RICHARD C. BRADLEY.